United States Patent Office 3,580,725
Patented May 25, 1971

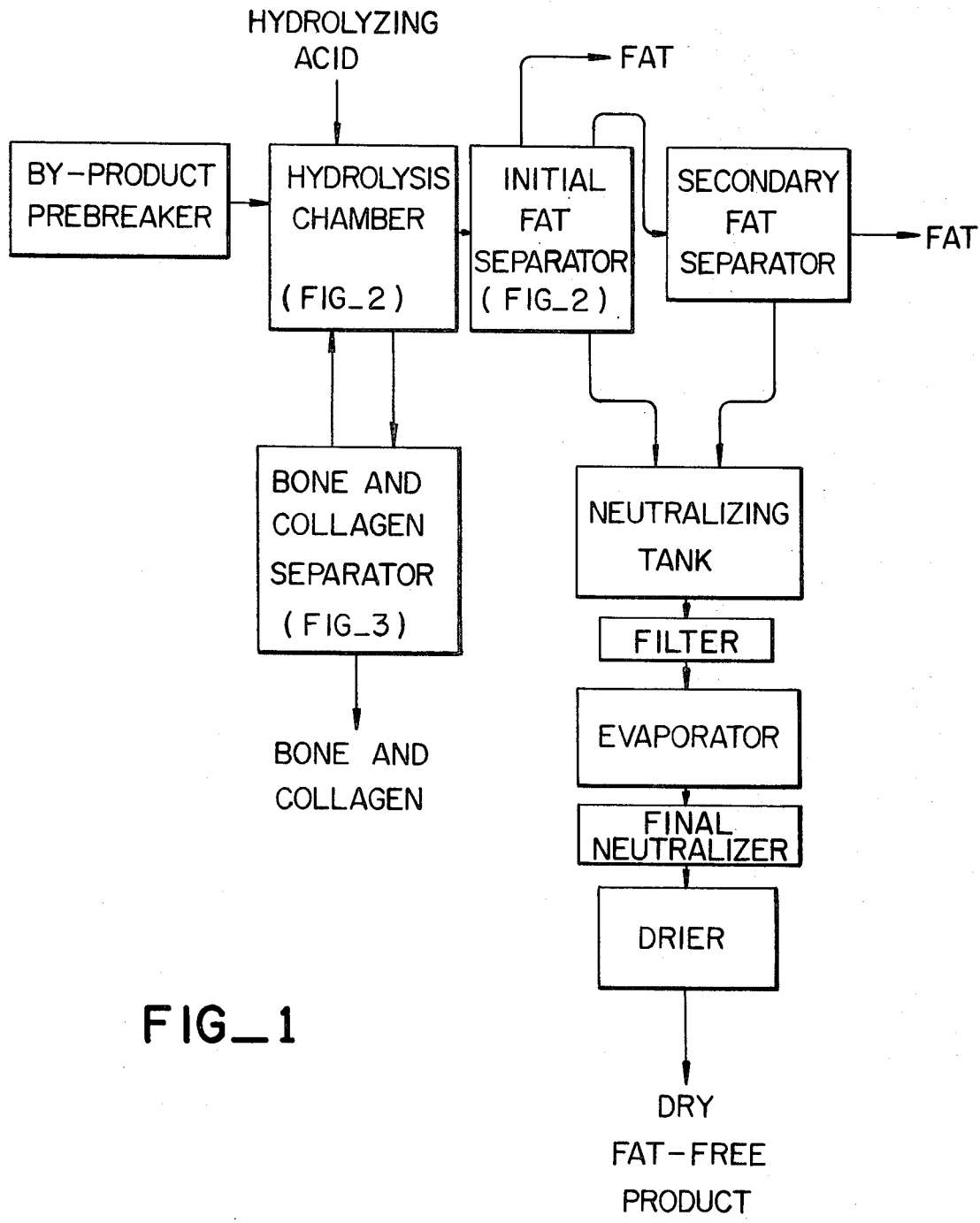
FIG_1

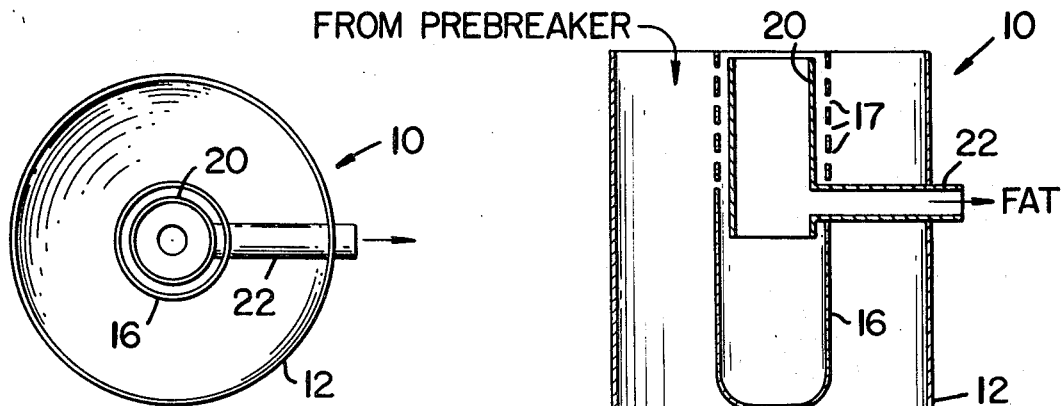
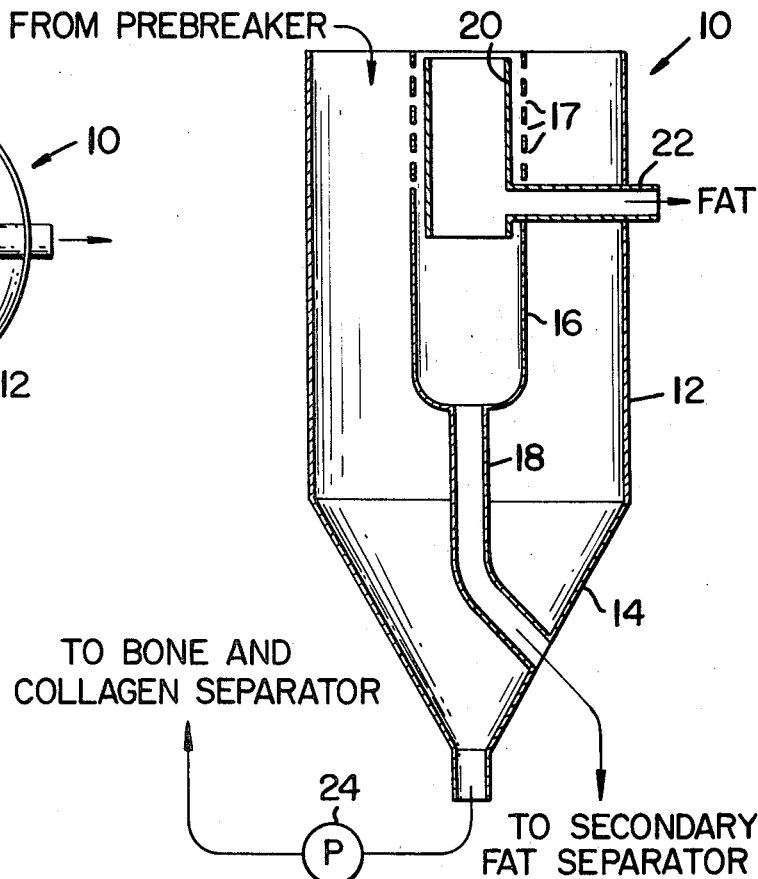
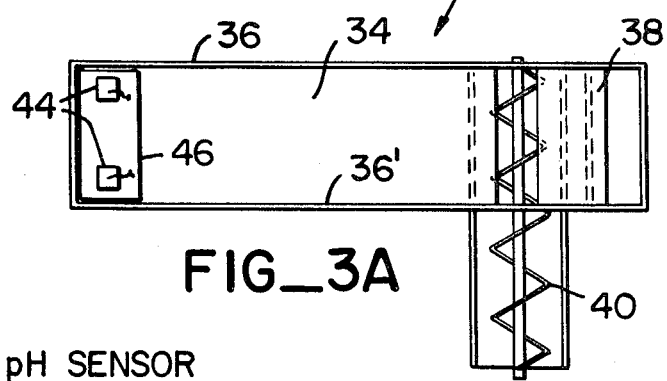
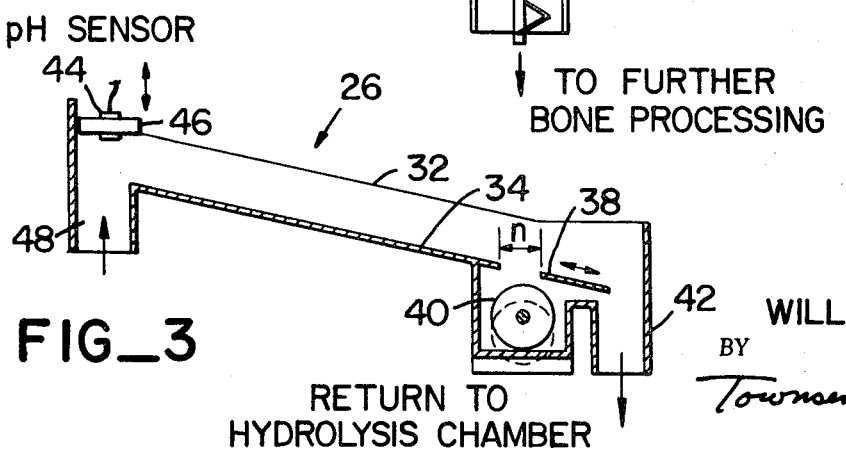

3,580,725
PROCESS FOR SEPARATING AND RECOVERING BONE AND COLLAGEN FROM ANIMAL BY-PRODUCTS
William Kuster, 1211 Avondale Road, Hillsborough, Calif. 94010
Filed Apr. 3, 1968, Ser. No. 718,629
Int. Cl. A23k 1/10
U.S. Cl. 99—7                              4 Claims

ABSTRACT OF THE DISCLOSURE

Method for separating bone (and collagen) from partially hydrolyzed animal tissue by employing an aqueous hydrolyzing solution wherein, because of the specific gravity differential between the bone (and collagen) and the fleshy tissue, the fleshy tissue will at least temporarily float in the solution while the bone (and collagen) will sink. As a result, the bone (and collagen) are separated from the fleshy tissue by passing the solution along an elongated path where the bone (and collagen) settle out of the solution.

---

This invention is directed to the treatment of animal by-products. More particularly, the invention relates to a process for separating bone and collagen from animal by-products also containing fleshy tissue and fat, and recovering the bone and collagen without materially affecting their naturally-occurring form, and apparatus for accomplishing the same.

Animal by-products are a rich source of protein for use in the preparation of animal, as well as human, feed supplements. As a result, methods have been developed to prepare nutritional feed supplements from such animal by-products. For example, U.S. Pat. No. 3,000,742, issued Sept. 19, 1961, discloses the use of an acid such as hydrochloric acid or phosphoric acid, having a pH of between 1 and 3, for the high temperature treatment of various bone-containing animal by-products. This type of acidic treatment not only dissolves the fleshy portions, thereby releasing the liquified fat, but when of sufficient duration, also hydrolyzes the protein in the bone and collagen to the soluble polypeptide state as well as reacting the minerals with the acid to form various salts.

Protein-rich feed supplements prepared by such procedures are of inherently high ash content, being rich in phosphates and other minerals released and/or formed by the hydrolysis of the bone and collagen. Although such minerals are of some nutritional value in the feed supplement, the bone and collagen have separate commercial value in their naturally-occurring state, i.e., prior to hydrolysis, for use as bone meal. In addition, the final protein content of the feed supplement can be regulated more closely. The phosphate content desired can be substantially provided by neutralization of the phosphoric acid used in the hydrolysis. Furthermore, when the bony substances are dissolved, the resulting feed supplement is often high in fluorine content and in some cases, strontium 90 (that tends to concentrate in animal bones), neither of which is desirable in the final product. Still further, the polypeptides derived from the collagen contain less of the essential amino acids than those derived from animal tissue in general.

Thus, broadly stated, the present invention involves the separation and recovery of bone and collagen from an aqueous suspension of animal by-products prior to the occurrence of any substantial hydrolysis (breakdown) of the bone and collagen. This desirable result is obtained by first comminuting the animal by-product to a particle size of about two inches or less in largest dimension. Although no actual lower size limit is required, from a practical aspect, particles having a minimum size of about one inch are most easily treated. The animal by-product particles are then subjected to high-temperature hydrolysis to dissolve at least those portions of the animal tissue that are connected to the bone and collagen. The high-temperature environment also liquifies the fat content of the by-product, causing its release from within the fleshy tissue as the tissue hydrolyzes. Thereafter, through utilization of the differences in specific gravity between bone and collagen on one hand and fleshy tissue and fat on the other, an efficient and thorough separation of the bone and collagen from the fleshy tissue and fat is accomplished.

It has been found that the difference in specific gravity between the aforementioned grouping of animal by-product components is sufficient to produce a discernible variation in rate of descent of the respective components within the hydrolyzing solution. In fact, as the specific gravity of the hydrolyzing solution is increased so as to approach that of the fleshy tissue, the tissue will remain suspended in the solution with a minimum of agitation while the bone and collagen will rapidly sink to the bottom of the body of solution. Furthermore, by selecting a hydrolysis solution having a specific gravity equal to or greater than the specific gravity of the fleshy tissue, but still less than that of the bony substance, the tissue will float in the solution while the bony substance gravitates towards the bottom of the solution.

In a preferred aspect of the invention, apparatus is employed that includes a hydrolyzing vessel (chamber) having an outlet near the bottom thereof from which a portion of the solution (including bone and collagen in high concentration as well as some partially dissolved fleshy tissue) is withdrawn and transferred to a gravity separating device. Such a device is most advantageously constructed as a downwardly-sloping trough positioned for receiving the aqueous solution at its upper end. The device is sloped so that the pieces of bone (that sink to the bottom of the solution) will be easily moved along the trough by the flowing stream. In addition, it is advantageous to arrange the trough so that it can be vibrated to move the heavy bone pieces along the bottom of the trough.

The device includes a weir adjustably spaced from the lower end of the sloping trough to define a gap (aperture) therebetween. Through proper adjustment of the specific gravity of the hydrolyzing solution, and/or the rate of flow of the solution, the bone and whatever portion of the collagen desired is caused to pass through the aperture, i.e., beneath the weir, while the lighter fleshy tissue is carried by the solution over the weir. Means, such as a screw conveyor, are provided below the gap to remove the bone and collagen as it sinks through the aperture. A recycle conduit is also provided to return the tissue-containing solution to the hydrolyzing vessel for further treatment such as completion of hydrolysis. It is advantageous for the weir to be an adjustably positionable planar extension of the bottom of the inclined trough, spaced from the lower end thereof so that a variable gap (or opening) can be provided for receiving whatever portion of the bone, collagen, and combined bone and tissue that it is desired to remove.

The temperature in the hydrolysis chamber is maintained at about the boiling point of the aqueous suspension and normally slightly above the boiling point of water at atmospheric pressure (about 214 to 218° F.). Of course, it is also possible to hydrolyze the animal by-product at temperatures higher or lower than the boiling point of water at atmospheric pressure. The desired temperature can be obtained by live steam, or a steam jacket or steam coil in the hydrolyzing vessel.

The various objects, features and advantages of this invention will become apparent when reference is made to the following detailed disclosure and especially in view of the attached drawing wherein:

FIG. 1 is a general flow diagram illustrating the procedure for treating animal by-products to recover bone and collagen as well as obtaining a dry fat-free product;

FIG. 2 is a cutaway elevational view of a hydrolysis chamber suitable for use in this invention;

FIG. 2a is top plan view of the embodiment as shown in FIG. 2;

FIG. 3 is a cutaway partially schematic elevational view of an inclined trough and weir suitable for use in this invention; and FIG. 3a is a top plan view of the embodiment as shown in FIG. 3.

The term "animal by-product" is intended to include slaughterhouse offal, poultry viscera, epidermal outgrowths and bone trimmings as well as whole animals such as poultry, fish and the like. For purposes of explanation, the term "bone" will be used throughout the remainder of this disclosure to include bone and collagens such as connective tissue, skin, cartilage and the like as well as fish scales, shells of crustaceans and other materials containing large amounts of chitin. Furthermore, although sulfuric acid, hydrochloric acid and the like may be employed, phosphoric acid is preferred and will be referred to hereinafter by way of example.

Referring now to the drawings wherein similar characters of reference represent corresponding parts in each of the several views, FIG. 1 depicts a schematic flow diagram wherein animal by-products are first treated in a pre-breaker to provide particles of a uniform size. The by-products particles are then subjected to partial hydrolysis in a hydrolysis chamber from which further treatment provides bone and collagen, fat, and a fat-free protein product. Preparation of a fat-free protein product is described in greater detail in copending patent application Ser. No. 718,460, filed Apr. 3, 1968, now U.S. Pat. No. 3,515,279.

Referring now to FIG. 2, there is shown chamber 10 including an upright cylindrical shell 12 secured to an inwardly-converging conical segment 14. Disposed within chamber 10 and in corresponding vertical alignment with shell 12 is tank 16. Tank 16 is in fluid communication with chamber 10 through a plurality of annularly-spaced openings 17. Conduit 18 is arranged in fluid communication with tank 16 to provide for withdrawal of fluid from the bottom of tank 16 as desired. Conventional means (not shown) can be employed to control the flow from tank 16. Mounted within tank 16 and in spaced alignment with the upright walls thereof is annular weir 20. Weir 20 includes near its lower end an outlet conduit 22 for withdrawing the upper layer of fluid (liquified fat) in tank 16. Chamber 10 includes pump 24 in fluid communication with chamber 10 through the lower end of conical segment 14 for withdrawing hydrolyzing solution from chamber 10.

In operation, chamber 10 is first filled with a hydrolyzing solution and heated to a temperature slightly in excess of the boiling point of water under atmospheric pressure. Heating can be accomplished in any conventional manner such as by injecting live steam or with heating coils or with outside heaters or a heating jacket (not shown). Thereafter, the animal by-product is transferred from the pre-breaker, where it has been reduced to particles having a size about two inches in largest dimension, and deposited in the hydrolyzing solution. The pre-breaker can be of any conventional design suitable for comminuting bones and flesh as described.

As the animal by-product is contacted by the hot hydrolyzing solution, the fleshy tissue begins to break down, thereby releasing liquified fat that floats to the top of the liquid in chamber 10. By proper adjustment of the liquid level, the fat-rich layer concentrated at the top of the solution, although with a portion of polypeptide solution, is caused to flow through openings 17 into tank 16 to produce a corresponding layer of liquified fat within tank 16. Tank 16 can be provided with a screen (not shown) across openings 17 to prevent passage of large undigested portions of animal tissue into tank 16. As a portion of the hydrolyzate is withdrawn from tank 16 through conduit 18, the uper level of liquidfied fat within tank 16 will be lowered. As a result, additional fat-rich hydrolyzate will flow into tank 16. Close control of the levels of protein hydrolyzate and liquified fat can be maintained with conventional level sensing devices (not shown). Thus, liquified fat will tend to be concentrated at the top of tank 16 and drawn off by flowing under weir 20 and out through outlet conduit 22 to a collecting and cooling device (not shown). Filtering and/or centrifuging devices and the like can be employed to improve purity while still at elevated temperatures.

Simultaneously with the removal of the concentrated stream of liquified fat from tank 16 through conduit 22, a stream of hydrolyzing solution (containing a high concentration of bone) is withdrawn from about the bottom of chamber 10 and conducted via pump 24 and through conduit 48 into the separator assembly 26. Separator assembly 26 comprises an inclined trough 32 having a trough bottom 34 and side walls 36 and 36'. The upper end of trough bottom 34 includes an opening through which the bone-rich hydrolyzing solution is introduced into trough 32. Trough 32 is sloped so that bone pieces that sink to trough bottom 34 will be more easily conveyed along trough bottom 34 towards the outlet.

The lower end of trough bottom 34 is provided with an adjustable extension 38 that can be positioned within the plane of trough bottom 34, but spaced a distance (gap) $n$ from the lower edge of trough bottom 34, to provide an opening for receiving the downward egress of bone. Below gap $n$ is an upwardly-inclined endless screw conveyor 40 extending substantially normal to trough 32. Beyond the end of extension plate 38 is conduit 42 for providing a path of egress for the fleshy tissue-rich hydrolyzing solution to be returned to vessel 10.

In operation, the stream of bone-rich hydrolysis solution is pumped to the upper end of separator 26. As it flows down the inclined trough, the heavier bone-containing particles rapidly sink to the bottom of the trough and are moved along the bottom by the flowing solution and into gap $n$ to be removed by conveyor 40. The hydrolysis solution containing the lighter fleshy tissue passes over extension 38 and into conduit 42. In this manner, the hydrolyzate, from which the bone and collagen have been removed, is recycled back to the chamber 10. By disposing separator 26 physically above chamber 10, the recycle return to chamber 10 is accomplished by gravitational egress through conduit 42. With additional refinements in the width of gap $n$ and the fluid velocity into separator assembly 26, collagen and bone can also be separated from each other. Furthermore, bone with attached tissue can be separated from "clean" bone segments.

In another aspect of this invention, separator assembly 26 is provided with a pH sensor such as electrode 44 to monitor the solution flowing from pump 24 so that a pH in the range of about 1 to 3 can be maintained. By positioning electrode 44 in plate 46 horizontally disposed above the upper end of inlet conduit 48 leading from pump 24 to separator assembly 26, electrode 44 will not be fouled by entrained hair, feathers or similar extraneous materials. Furthermore, plate 46 can be movably mounted so that its distance from inlet conduit 48 can be varied depending upon the rate of flow of the bone-containing solution.

To further illustrate the invention, the following example is provided. It should be understood that the particular details thereof are not to be regarded as limitations as they may be varied as will be understood by one skilled in this art.

About 8000 pounds/hour of animal by-product was fed to a pre-breaker where the individual particle size was reduced to 1 to 2 inches in largest dimension. The comminuted animal by-product was introduced into a hydrolysis chamber having about a 3000 gallon capacity and containing protein material and polypeptides in a hot aqueous solution of phosphoric acid having a pH of about 3 (and a specific gravity of about 1.1). After start-up was completed, a bone-rich solution was continuously removed from the bottom of the chamber at about 300 gallons/minute (approximately 2700 pounds/minute). The bone-rich solution was pumped to the gravity separator compirsing an inclined trough having about a 10° drop over about seven feet of length. The trough was about two feet wide. A one and one-half inch gap (aperture) was provided between the lower edge of the trough and the leading edge of the adjustable extension plate. As the solution flowed into the upper end of the trough, the bone immediately sank to the bottom of the stream and was moved along the downwardly-sloping trough by the flowing solution and a vibrator until it sank into the aperture. The aqueous suspension continued over the gap, carrying with it the fleshy tissue and was recycled to the chamber. The bone was elevated with a screw conveyor out of the aperture and to further processing for the production of bone meal.

Although the foregoing invention has been described in some detail by way of illustration for purposes of clarity of understanding, it will be apparent to one skilled in this art that certain changes and modifications may be practiced within the spirit of this invention as limited only by the scope of the appended claims.

What is claimed is:

1. A process for recovering bone and collagen from naturally-occurring animal by-products also containing fleshy tissue that has a lower specific gravity than said bone and collagen, comprising the steps of: dividing the by-product into particles of up to about two inches in largest dimension; suspending said particles in a hot aqueous solution of a hydrolyzing acid having a pH of from about 1 to 3, for a time sufficient to hydrolyze and liquify at least a part of the fleshy tissue and release said bone and collagen from said fleshy tissue, but insufficient to liquify any of said bone and collagen, said hydrolyzing solution having a specific gravity equal to or greater than the specific gravity of the fleshy tissue; allowing said bone and collagen to selectively gravitate in said solution towards the bottom of the solution and said fleshy tissue to float upwardly in the solution; and removing said bone and collagen from the bottom of said solution.

2. A process in accordance with claim 1 wherein said selective gravitation is accomplished by flowing said solution along a downwardly-inclined path having an opening for receiving said bone and collagen.

3. A process in accordance with claim 2 wherein said suspension is subjected to additional hydrolysis subsequent to removal of said bone and collagen.

4. A process in accordance with claim 1 wherein said acid is phosphoric acid.

References Cited

UNITED STATES PATENTS

| | | | |
|---|---|---|---|
| 2,589,288 | 3/1952 | Ryan | 99—7 |
| 2,622,027 | 12/1952 | Torr | 99—107X |
| 2,635,104 | 4/1953 | Chayen | 260—412.6 |
| 3,000,742 | 9/1961 | Kuster | 99—7 |
| 3,114,638 | 12/1963 | Huhn et al. | 99—7 |
| 3,294,826 | 12/1966 | O'Neill | 260—412.7 |
| 3,301,681 | 1/1967 | Kuster | 99—7 |

FOREIGN PATENTS

| | | | |
|---|---|---|---|
| 472,379 | 3/1951 | Canada | 99—7 |

WILBUR L. BASCOMB, JR., Primary Examiner

F. E. DRUMMOND, Assistant Examiner

U.S. Cl. X.R.

99—107; 260—412.6; 210—195